United States Patent Office 3,397,222
Patented Aug. 13, 1968

3,397,222
ALKYLSULPHATE SALTS OF 2-HOMOMYRTENYL-
OXY 1-DIETHYL-AMINO ETHANE
Olivier Paul Gaudin, 91 Blvd. du General Koenig,
92 Neuilly-sur-Seine, France
No Drawing. Filed May 17, 1966, Ser. No. 550,590
Claims priority, application France, Jan. 18, 1966,
46,222
3 Claims. (Cl. 260—459)

In his special medicine patent No. 39M filed in France on July 15, 1960, the applicant describes the compound 2-homomyrtenyloxy 1-diethylamino ethane, the latter being of utility as a local anaesthetic and a spasmolytic.

In this patent, there are also mentioned salts of this compound with simple acids such as hydrochloric acid and sulphuric acid.

It has now been discovered that the 2-homomyrtenyloxy 1-diethylamino ethane alkylsulphates—special salts constituting new chemical compounds—possess, both on the free base and on the simple salts of the latter, marked advantages in the aforementioned therapeutic indications and in particular as a local anaesthetic.

The object of the present invention is therefore to provide 2-homomyrtenyloxy 1-diethylamino ethane alkylsulphates having the formula:

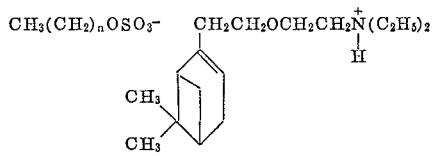

in which $n$ is an integer within the range 7–17.

Another object of the invention is to provide a process of preparing said alkylsulphates.

This process comprises reacting by means of a double decomposition an alkylsulphuric acid salt with 2-homomyrtenyloxy 1-diethylamino ethane salt. The reaction is advantageously carried out in an aqueous medium with an alkylsulphuric acid alkali metal salt, such as the sodium salt, and a water-soluble salt of the base such as the hydrochloride.

The required alkylsulphate separates from the aqueous medium in the form of a viscous gel. It is extracted with an organic solvent which is non-miscible with water and non-emulsifiable by the alkylsulphate. The ethers constitute appropriate solvents for this purpose.

The ethereal solutions of alkylsulphate are washed with water, dried and finally evaporated.

After evaporation under a vacuum in a thin layer, a thick liquid is obtained having a constitution corresponding to the aforementioned general formula.

These alkylsulphates give in water gelled pseudo-solutions which are stable in an acid and alkaline medium.

These salts are soluble in various organic solvents, such as ethyl alcohol, diethyl ether, benzene and chloroform.

The preferred alkylsulphates according to the invention are:

laurylsulphate ($n=11$) of homomyrtenyloxydiethylaminoethane, which contains 49.90% of base, and
cetylsulphate ($n=15$) of homomyrtenyloxydiethylaminoethane, which contains 44.98% of base.

An example of the preparation of each of the two compounds will now be given by way of illustration:

Example 1.—2-homomyrtenyloxy 1-diethylamino ethane laurylsulphate 288 g. of 98% pure sodium laurylsulphate are put in solution in 5 litres of water. 265 g. of homomyrtenyloxydiethylaminoethane, then about 1 litre of normal hydrochloric acid, are added until a pH of 6–6.5 is obtained.

The solution gels. It is liquified by the addition of ether and then an extraction is effected with 3 litres of diethyl ether. After stirring and leaving the mixture for a time, the ether is separated, washed with 300 ml. of water and then dried on anhydrous $SO_4Na_2$.

The ether is then distilled at ordinary pressure then, when it no longer distils, the residue is subjected to a concentration under a vacuum in a rotating evaporator. About 520 g. of a thick liquid product are then obtained having the following analysis.

Content of homomyrtenyloxydiethylaminoethane titrated with Ammonium Reineckate: Found, 49.1%; Calculated: 49,87%. Content of sulphur: Found, 5.78%; Calculated: 6.02%.

The purity of the product obtained is in the neighborhood of 98%, which substantially corresponds to the purity of the starting sodium laurylsulphate found upon titration. The pure sodium laurylsulphates supplied by industry always contain small amounts of homologous alkylsulphate and alkyl oxide.

If instead of pure laurylsulphate there is employed the commercial quality of the product containing about 70% of $C_{12}$ alcohol sulphate and 30% of $C_{14}$ alcohol sulphate, a product containing about 70% of laurylsulphate and 30% of 2-homomyrtenyloxy 1-diethylamino ethane myristyl sulphate is obtained.

Example 2.—2-homomyrtenyloxy 1-diethylamino ethane cetylsulphate 346 g. of sodium cetylsulphate are put in solution in 6 litres of water. 265 g. of homomyrtenyloxydiethylaminoethane, then about 1 litre of normal hydrochloric acid, are added until a pH of 7 is obtained.

The solution is extracted with 3 litres of diethyl ether. After stirring and leaving for a time the ether is separated, washed with a little water and then dried over anhydrous sodium sulphate.

The ether is then distilled at ordinary pressure and the residue is then subjected to a concentration under a vacuum to eliminate the last traces of solvent. About 560 g. of a thick product are obtained having the following analysis.

Content of homomyrtenyloxydiethylaminoethane: Found, 44.3%; Calculated: 45.12%. Content of sulphur: Found, 5.37%; Calculated, 5.44%.

The alkylsulphates according to the invention have the following advantages over the base, from which they are derived, as concerns their activity.

Their anaesthetic action is considerably increased over that of the base or of the base salified by a simple acid such as hydrochloric acid. This is revealed by Regnier's method on the cornea of the eye of the rabbit. It is moreover observed that if this test is carried out at various pH, the activity of the alkylsulphates is maximum in the neighbourhood of neutrality. The same is true for the local anaesthetic power of infiltration on the back of the Guinea pig.

The following tables show these different facts, the cocaine being included in these tests for comparative purposes, its activity being used as a unit.

Comparative table of the actions on the eye of the rabbit according to Regnier's method, ascertained in a homogeneous series of experiments

| | |
|---|---|
| Cocaine (in the hydrochloride form) | 1 |
| 2-homomyrtenyloxy 1-diethylamino ethane (in the hydrochloride form) | 1.2 |
| 2-homomyrtenyloxy 1-diethylamino ethane (in the laurylsulphate form), pH 7 | 1.7 to 2 |

Comparative table in the infiltration action on the back of the Guinea pig

| | |
|---|---|
| Cocaine (in the hydrochloride form) | 1 |
| 2-homomyrtenyloxy 1-diethylamino ethane (in the hydrochloride form) | 22 |
| 2-homomyrtenyloxy 1-diethylamino ethane (in the laurylsulphate form), pH 7 | 30 |

As concerns the spasmolytic action, such as that ascertained by the neurotropic and musculotropic effect, on the isolated intestine of the Guinea pig, it is characterized in respect of the alkylsulphates by a retarding effect relative to that of the base or of the base salified by a simple acid.

Having now described my invention, what I claim as new and desire to secure by Letters Patent is:

1. 2-homomyrtenyloxy 1-diethylamino ethane alkylsulphate having the formula:

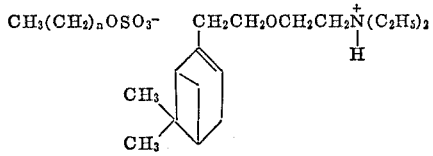

in which $n$ is an integer within the range 7–17.

2. 2-homomyrtenyloxy 1-diethylamino ethane laurylsulphate.

3. 2-homomyrtenyloxy 1-diethylamino ethane cetylsulphate.

No references cited.

CHARLES B. PARKER, *Primary Examiner.*

L. C. MARUZO, *Assistant Examiner.*